US008662567B2

(12) United States Patent
Aul et al.

(10) Patent No.: US 8,662,567 B2
(45) Date of Patent: Mar. 4, 2014

(54) VEHICLE ROOF SUPPORT PILLAR ASSEMBLY

(75) Inventors: Gurpreet S. Aul, London (CA); Martin L. Bliss, Thorndale (CA); Michael E. Bolas, Troy, MI (US); Jose U. Coelho, London (CA); Dean A. Gericke, Brighton, MI (US); Larry D. Marks, London (CA)

(73) Assignee: Vari-Form, Inc., Strathroy, Ontario (CA)

( * ) Notice: Subject to any disclaimer, the term of this patent is extended or adjusted under 35 U.S.C. 154(b) by 354 days.

(21) Appl. No.: 12/693,914

(22) Filed: Jan. 26, 2010

(65) Prior Publication Data
US 2010/0194147 A1 Aug. 5, 2010

Related U.S. Application Data

(60) Provisional application No. 61/149,262, filed on Feb. 2, 2009.

(51) Int. Cl.
 *B62D 25/04* (2006.01)
 *B62D 25/02* (2006.01)
(52) U.S. Cl.
 USPC .............................. 296/193.06; 296/193.05
(58) Field of Classification Search
 USPC ................... 296/193.06, 203.01, 205, 19.05, 296/187.12, 30, 146.6, 193.04, 29
 See application file for complete search history.

(56) References Cited

U.S. PATENT DOCUMENTS

| | | | |
|---|---|---|---|
| 2,380,523 A * | 7/1945 | Hicks et al. .................... | 296/204 |
| 5,382,071 A | 1/1995 | Enning et al. | |
| 5,785,378 A * | 7/1998 | Seefried et al. .......... | 296/193.05 |
| 5,839,777 A | 11/1998 | Vlahovic | |
| 6,179,370 B1 | 1/2001 | Takeuchi | |
| 6,217,109 B1 | 4/2001 | Okana et al. | |
| 6,279,990 B1 * | 8/2001 | Miyasaka et al. ........ | 296/203.03 |
| 6,282,790 B1 | 9/2001 | Jaekel et al. | |
| 6,322,135 B1 * | 11/2001 | Okana et al. ............. | 296/203.03 |
| 7,121,615 B2 * | 10/2006 | Hoshino ................... | 296/203.03 |
| 7,293,823 B2 * | 11/2007 | Chen et al. ................ | 296/203.03 |
| 7,357,448 B2 | 4/2008 | Chen et al. | |
| 7,407,222 B2 * | 8/2008 | Anderson et al. ........ | 296/193.06 |
| 7,543,883 B2 * | 6/2009 | Chen et al. ................ | 296/203.03 |
| 8,162,388 B2 * | 4/2012 | Balzer et al. ............. | 296/203.03 |

(Continued)

FOREIGN PATENT DOCUMENTS

| | | |
|---|---|---|
| CN | 1414916 | 4/2003 |
| JP | 4297383 | 10/1992 |

OTHER PUBLICATIONS

European Search Report, Oct. 29, 2010 (8 pages).

(Continued)

*Primary Examiner* — Glenn Dayoan
*Assistant Examiner* — Sunsurraye Westbrook
(74) *Attorney, Agent, or Firm* — Reising Ethington P.C.

(57) ABSTRACT

A vehicle roof support pillar assembly may include a first support pillar and a second support pillar. The first support pillar may have a first hollow body with a first side surface. The second support pillar may have a second hollow body with a second side surface, the second support pillar may be positioned next to the first hollow body when assembled and in use. The first and second side surfaces may contact each other along at least a portion of their vertical extent.

20 Claims, 13 Drawing Sheets

(56) References Cited

U.S. PATENT DOCUMENTS

| | | |
|---|---|---|
| 8,439,432 B2 * | 5/2013 | Nusier et al. .................. 296/210 |
| 2006/0005503 A1 | 1/2006 | Bladow et al. |
| 2006/0208537 A1 * | 9/2006 | Dingman et al. ........ 296/193.05 |
| 2007/0257517 A1 * | 11/2007 | Day et al. .................. 296/193.06 |
| 2008/0001437 A1 | 1/2008 | Balzer et al. |
| 2008/0315628 A1 * | 12/2008 | Obayashi ................. 296/193.06 |

OTHER PUBLICATIONS

Chinese Search Report & Office Action, dated Jan. 30, 2013 (6 pages).

* cited by examiner

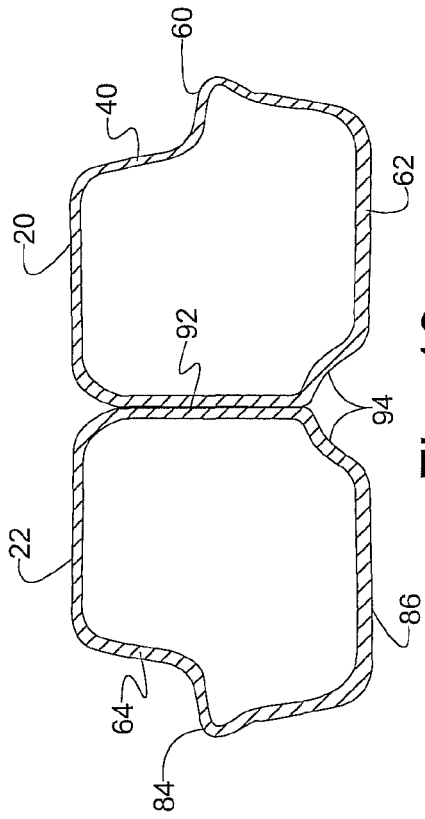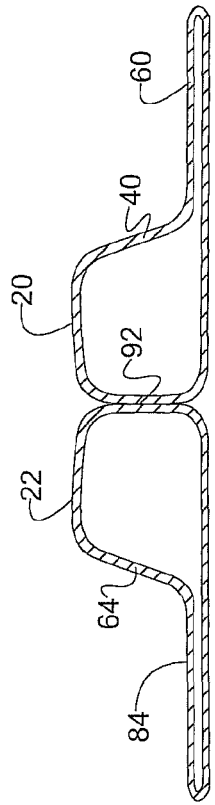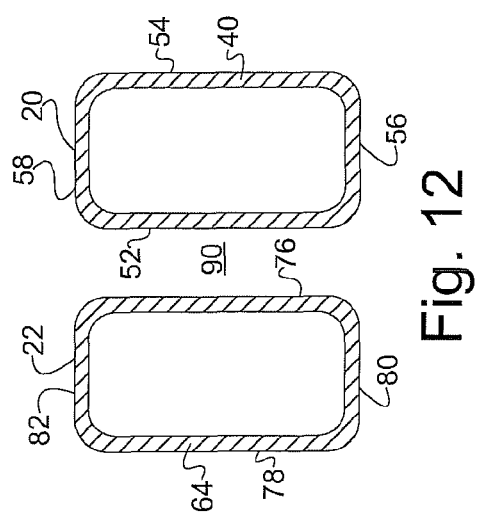

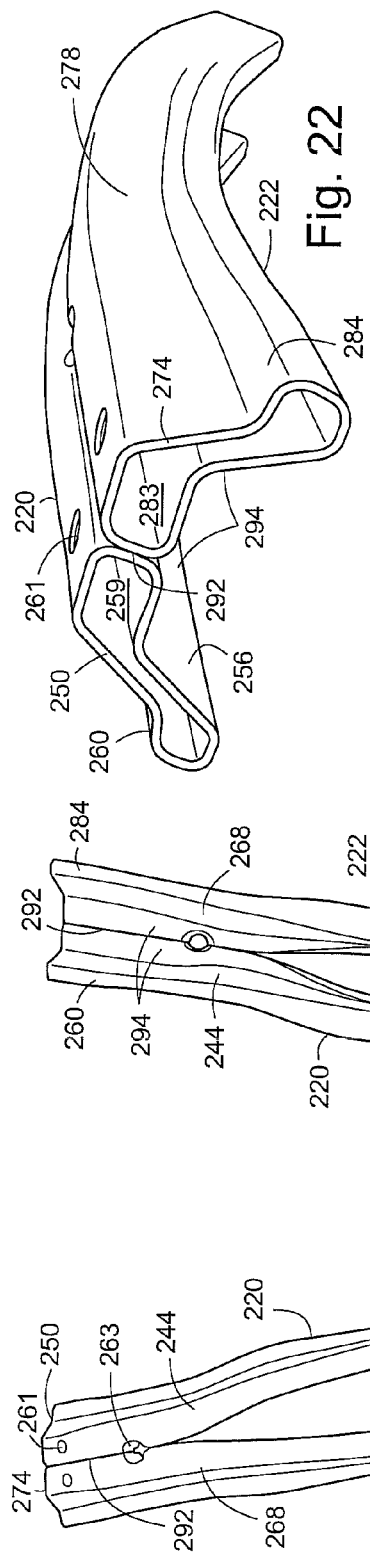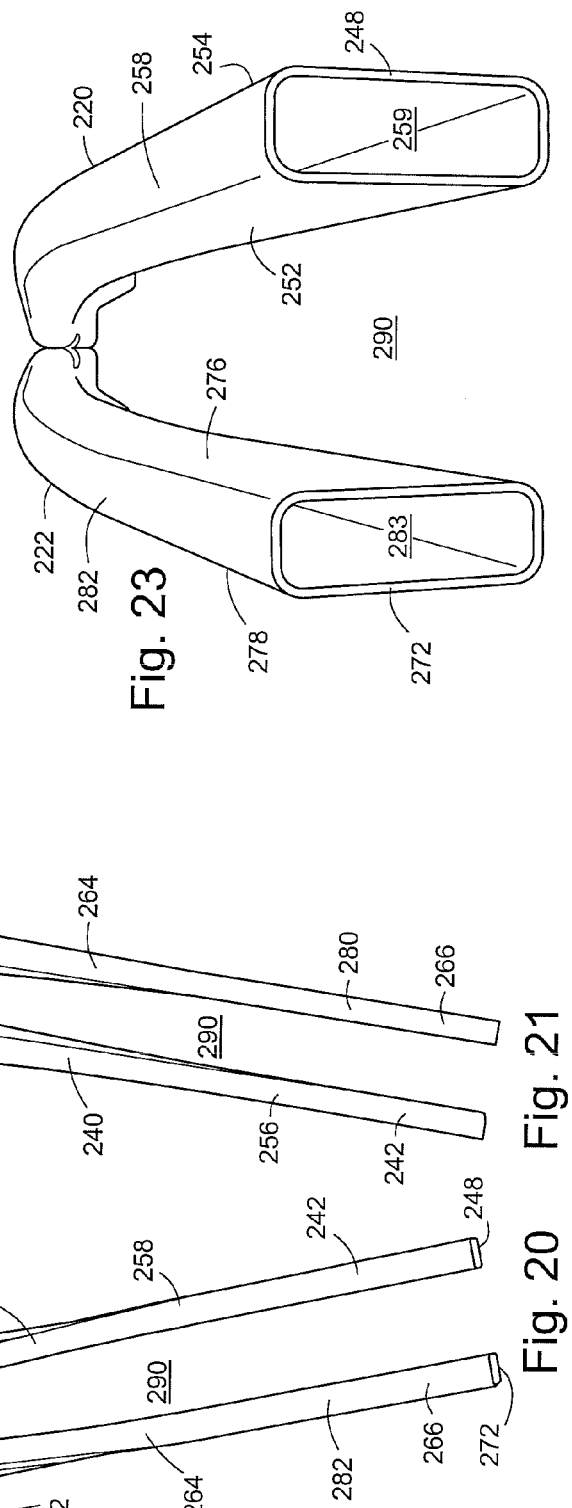

VEHICLE ROOF SUPPORT PILLAR ASSEMBLY

REFERENCE TO CO-PENDING APPLICATION

This application claims the benefit of, and incorporates by reference in its entirety, U.S. Provisional Ser. No. 61/149,262 filed Feb. 2, 2009.

FIELD OF THE INVENTION

The present invention relates generally to a vehicle body, and more particularly to a vehicle frame structure.

BACKGROUND OF THE INVENTION

Vehicle frame structures can carry vehicle components like body panels and roofs. A roof support pillar or post, for instance, holds up or supports a roof of an automobile. Roof support pillars are conventionally identified by letters A, B, C, D, and others if needed, depending on the design and construction of the automobile and on the location of the pillar. A B-pillar is ordinarily located longitudinally between a front door and a rear door and extends vertically between a rocker panel and a roof rail. A B-pillar protects automobile occupants during side-impact crashes and roll-over accidents. A conventionally made B-pillar includes multiple layers of stamped sheet metal welded together, or is made by an extrusion metalforming process.

SUMMARY OF THE DISCLOSURE

In at least one implementation, a vehicle roof support pillar assembly may include a first support pillar and a second support pillar. The first support pillar may have a first hollow body with a first side surface. The second support pillar may have a second hollow body with a second side surface, the second support pillar may be positioned next to the first hollow body. The first and second side surfaces may contact each other along at least a portion of their vertical extent.

In at least one implementation, an auxiliary vehicle roof support pillar assembly may include a first auxiliary support pillar and a second auxiliary support pillar. The first auxiliary support pillar may have a first hollow body that may be constructed to extend vertically along a portion or more of a primary vehicle roof support pillar, and that may be constructed to be attached to the primary vehicle roof support pillar. The second auxiliary support pillar may have a second hollow body that may be constructed to extend vertically along the portion or more of the primary vehicle roof support pillar and that may be located next to the first hollow body. The second auxiliary support pillar may be constructed to attach to the primary vehicle roof support pillar so that the first and second auxiliary support pillars reinforce the primary vehicle roof support pillar.

In at least one implementation, a vehicle roof support pillar assembly may include a primary vehicle roof support pillar and an auxiliary vehicle roof support pillar assembly. The auxiliary vehicle roof support pillar assembly may include a first auxiliary support pillar and a second auxiliary support pillar. The first auxiliary support pillar may have a first hollow body that may extend vertically along a portion or more of the primary vehicle roof support pillar. The second auxiliary support pillar may have a second hollow body that may extend vertically along the portion or more of the primary vehicle roof support pillar and that may be located next to the first hollow body. Together, the first and second auxiliary support pillars may reinforce the primary vehicle roof support pillar.

BRIEF DESCRIPTION OF THE DRAWINGS

The following detailed description of preferred embodiments and best mode will be set forth with reference to the accompanying drawings, in which:

FIG. 12 is a cross-sectional view taken at arrows 12-12 in FIG. 1;

FIG. 13 is a cross-sectional view taken at arrows 13-13 in FIG. 1;

FIG. 14 is a cross-sectional view taken at arrows 14-14 in FIG. 1;

FIG. 20 is a perspective front view of exemplary embodiment of a first and second support pillar of the vehicle roof support pillar assembly of FIG. 15;

FIG. 21 is a perspective rear view of the first and second support pillars of FIG. 20;

FIG. 22 is a perspective view taken at an upper portion of the first and second support pillars of FIG. 20; and FIG. 23 is a perspective view taken at a lower portion of the first and second support pillars of FIG. 20.

DETAILED DESCRIPTION OF PREFERRED EMBODIMENTS

Referring in more detail to the drawings, exemplary embodiments of a vehicle roof support pillar assembly, such as a B-pillar for an automotive body frame, may have a pair of support pillars that are each shaped by a hydroforming process or another metal working process. The automotive body frame may be that of a passenger car, truck, sport-utility-vehicle, crossover vehicle, or the like. The support pillars allow optimization of the design of the vehicle roof support pillar assembly in order to maximize strength, meet packaging requirements, and reduce weight and costs thereof. Though described in the context of a B-pillar, the vehicle roof support pillar assembly could be constructed and modified for use in another pillar such as an A-pillar or a C-pillar, or for use in another related structural component of a vehicle.

Figure 1:
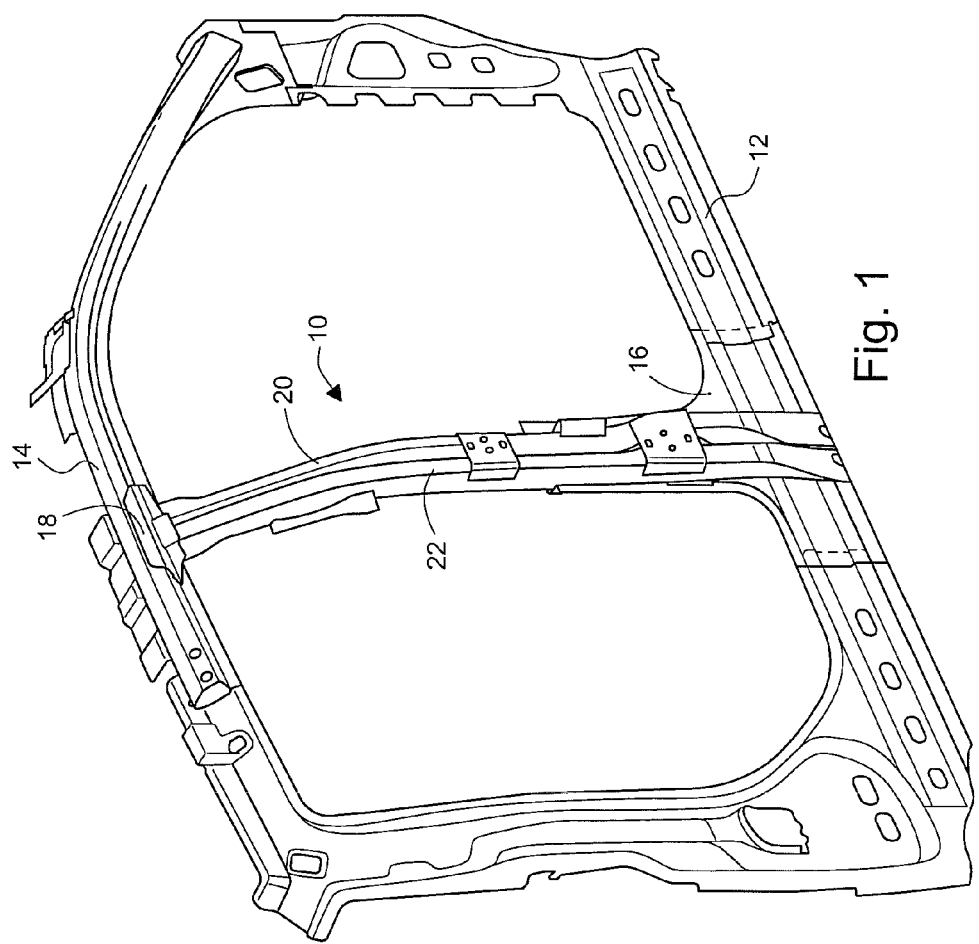
FIG. 1 is a perspective view of a first exemplary embodiment of a vehicle roof support pillar assembly shown assembled in an exemplary automotive body frame.
Figure 2:
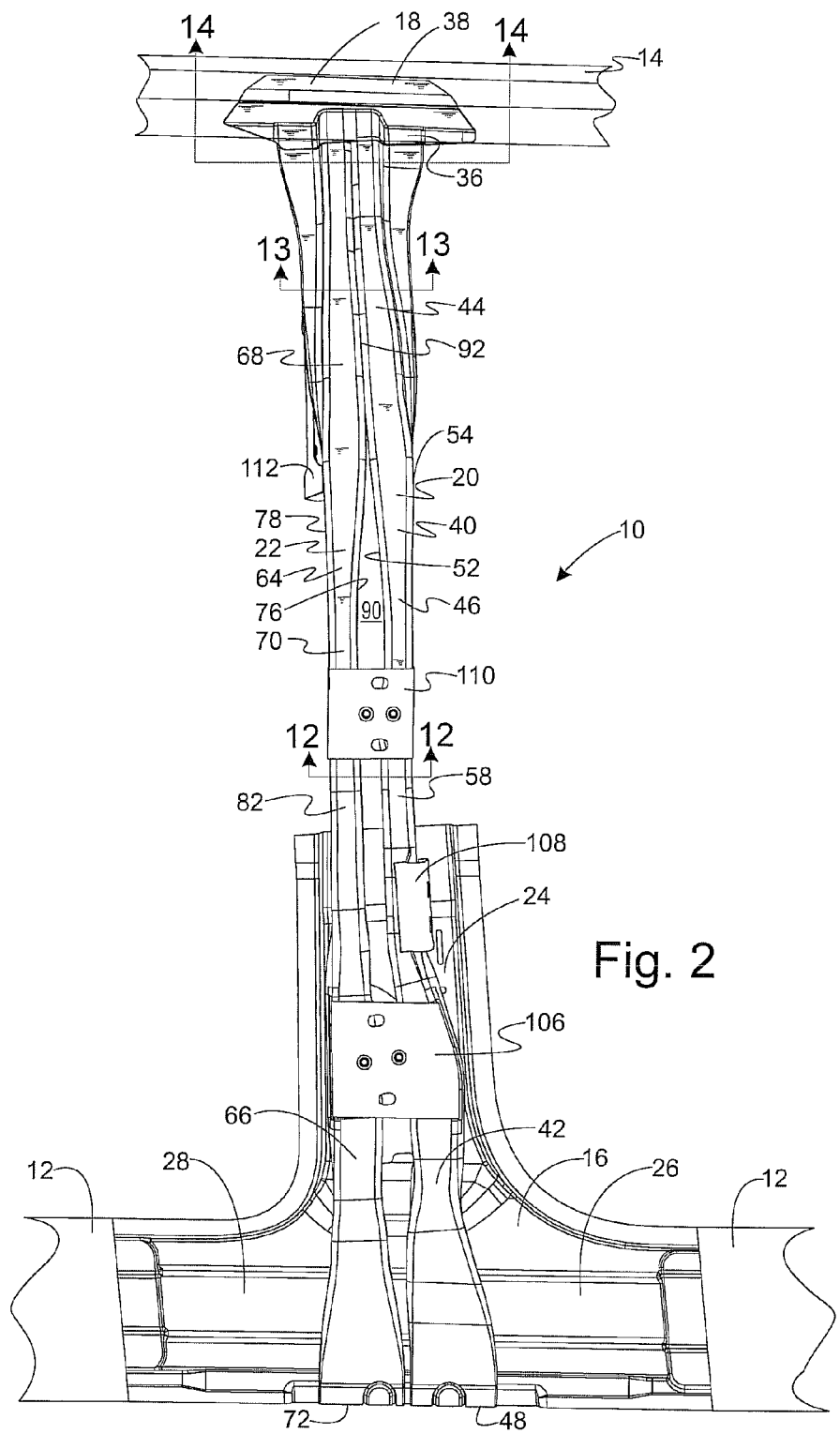
FIG. 2 is a perspective front view of the vehicle roof support pillar assembly of FIG. 1.
Figure 3:
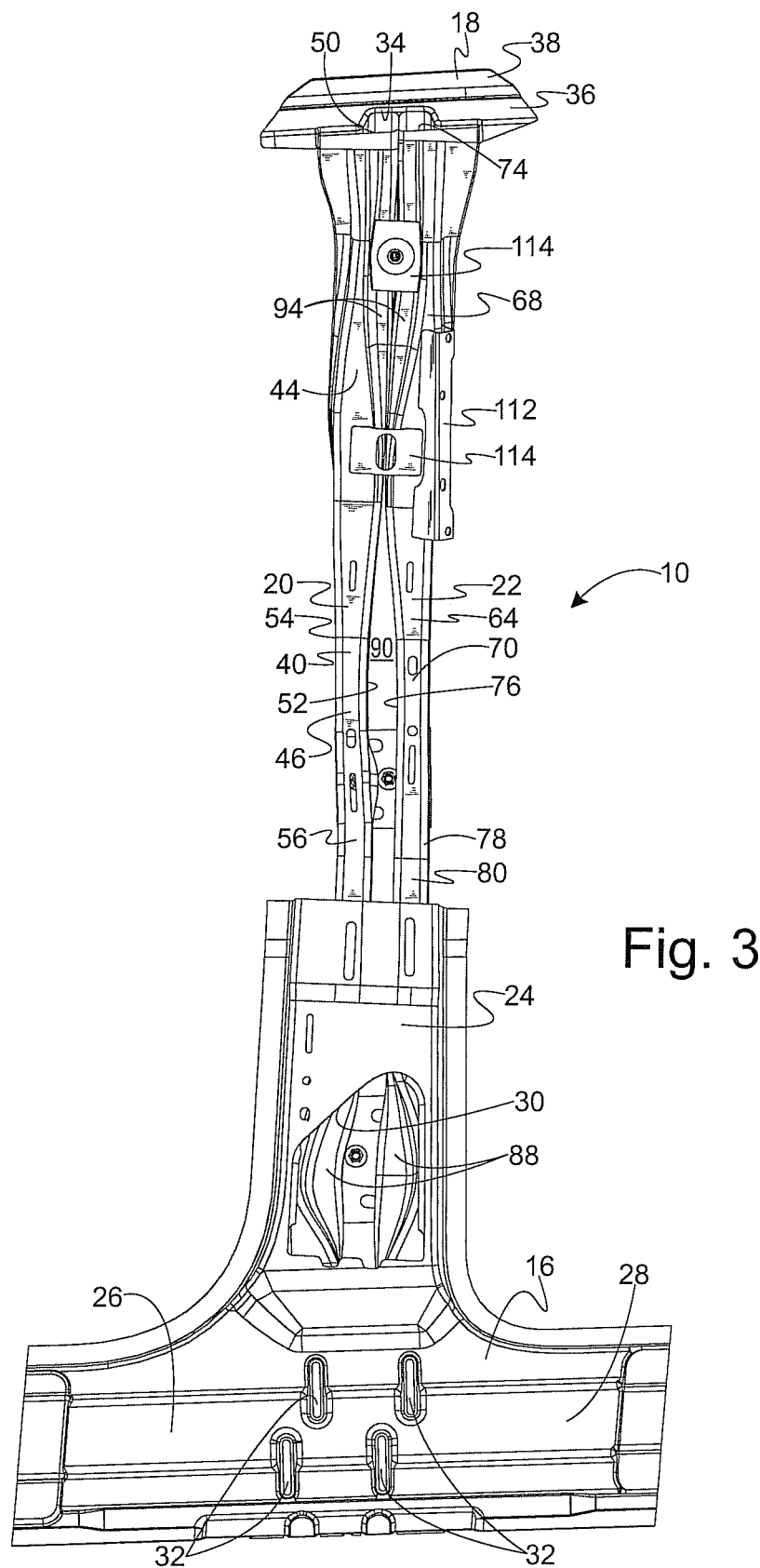
FIG. 3 is a perspective rear view of the vehicle roof support pillar assembly of FIG. 1.

A first exemplary embodiment of a vehicle roof support pillar assembly 10 is shown in FIGS. 1-14. The roof support pillar assembly 10 braces a vehicle roof (not shown) above a passenger compartment of an automobile, carries various components of a front and/or rear door (not shown), and protects automobile occupants in the event of side-impact crashes and roll-over accidents. Referring to FIG. 1, the roof support pillar assembly 10, or exemplary B-pillar, may be located longitudinally between the front door and window thereof and the rear door and window thereof (shown with body side inner panel). The roof support pillar assembly 10 may connect and extend in a vertical or lengthwise direction between a rocker panel 12 and a roof rail 14. The rocker panel 12 may be manufactured by a stamping process, and the roof rail 14 may be manufactured by a hydroforming process. In the illustrated embodiment, the roof support pillar assembly 10 may be a multi-piece assembly and may include a rocker panel attachment 16, a roof rail attachment 18, a first support pillar 20, a second support pillar 22, and various component carriers and brackets. The roof support pillar assembly 10 need not necessarily include all of the components shown and described, and can include other components not shown and described. The directional coordinates used herein are with respect to the automotive body frame where "cross-car" refers to the direction across the frame from the driver side door to the passenger side door, and vice versa; "longitudinal" refers to the direction across the frame from the front bumper (fore) to the rear bumper (aft), and vice versa; and "vertical" refers to the direction from the ground to the vehicle roof, and vice versa.

The rocker panel attachment 16 is an intermediate piece connecting the rocker panel 12 to the first and second support pillars 20, 22. Referring to FIGS. 1, 2, 3, 7, and 8, the rocker panel attachment 16 may be a stamped or otherwise formed piece of metal, and may include an upright portion 24, a first arm 26, and a second arm 28. The upright portion 24 may extend vertically along a portion of the first and second support pillars 20, 22, and may support the pillars therealong. The upright portion 24 may have an opening 30 located therein to provide access to an underlying portion of the first and second support pillars 20, 22. The first and second arms 26, 28 may extend in opposite longitudinal directions with respect to the upright portion 24. Each of the first and second arms 26, 28 may connect to the rocker panel 12 at different locations via a bracket, a mechanical interconnection, welding, or another suitable joint. Multiple mig welds 32 may be used to connect the first and second support pillars 20, 22 to the rocker panel attachment 16. Of course other ways may be used to connect the pillars to the attachment including, but not limited to, bracketing, mechanically interconnecting such as bolting or riveting, other types of welding, or other suitable joints.

The roof rail attachment 18 is an intermediate piece connecting the roof rail 14 to the first and second support pillars 20, 22. Referring to FIGS. 1-4 and 9-11, the roof rail attachment 18 may be a stamped or otherwise formed piece of metal, and may include a recess 34, a first flange 36, and a second flange 38. The recess 34 may conform to the first and second support pillars 20, 22, and may receive the support pillars therein. The first flange 36 may connect to the first and second support pillars 20, 22, and the second flange 38 may connect to the roof rail 14.

The first and second support pillars 20, 22 are designed and constructed according to the architecture of the particular automobile in which they will be installed. The first and second support pillars 20, 22 may also be designed and constructed to support static forces emitted by the vehicle roof and other forces associated with the automotive body frame. In other words, in this embodiment, the first and second support pillars 20, 22 may provide the principal support needed between the rocker panel 12 and the roof rail 14; that is to say that other supporting-structural-components beside the rocker panel attachment 16 and the roof rail attachment 18 may not be needed or used in some cases, though can. The first and second support pillars 20, 22 may resist breaking and extreme buckling, bending, and deformation along the length of the pillars.

The first support pillar 20 may be located at a fore or leading position closest to the front door relative to the second support pillar 22. The first support pillar 20 may be a separate and distinct piece from the second support pillar 22. The first support pillar 20 has a first hollow body 40 that may be formed by a hydroforming process, or another metal working process. In an exemplary hydroforming process—a so-called pressure-sequence hydroforming process—a tubular blank may be initially cut to desired size and may be placed in a hydroforming machine between first and second die halves. The ends of the tubular blank may be sealed, and an internal hydraulic pressure (e.g., 1,000 p.s.i.) may be applied inside of the tubular blank. The first and second die halves may be progressively closed and the tubular blank may in turn be progressively deformed. The first and second die halves may then be completely closed and a relatively increased internal hydraulic pressure (e.g., 10,000 p.s.i.) may be applied inside of the tubular blank. The tubular blank may then take on the shape of the closed die halves, the die halves may be opened, and the now-formed first hollow body 40 may be removed. In this exemplary hydroforming process, a cross-section of the tubular blank may not be expanded; in other words, the thickness of the walls of the tubular blank may not be thinned in any appreciable way, and instead only the shape of the cross-section is modified during the process while the perimeter length of the cross-sectioned walls does not change. Of course, in other exemplary hydroforming processes, the tubular blank could be expanded.

The hydroforming process may differ in other examples. For instance, the described steps and specifications can differ, all of the described steps need not necessarily be performed such as applying the progressively increasing first internal hydraulic pressure where instead only a single relatively high internal hydraulic pressure would be applied once the die halves are completely closed with the internal pressure acting to form the part, and additional steps can be performed such as metalworking processes. The exact hydroforming process or metal working process will depend on, among other things, the desired final shape of the first support pillar 20. In an exemplary metal working process, a first half of the first hollow body 40 may be formed by a stamping process and a separate second half of the first hollow body may also be formed by a stamping process; then, the first and second halves may be welded together to form the first hollow body.

Figure 4:
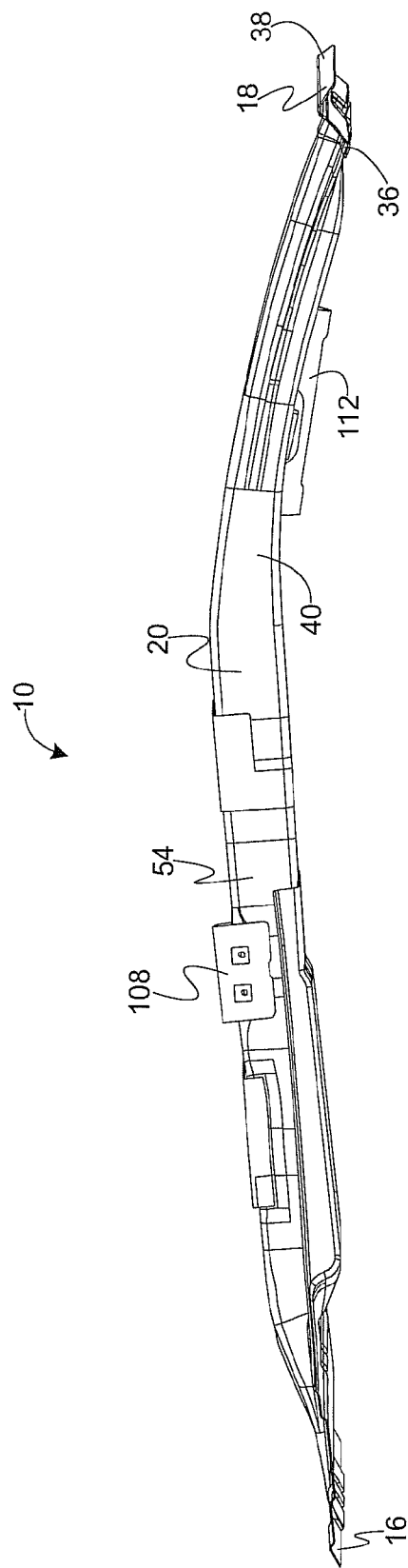
FIG. 4 is a side view of the vehicle roof support pillar assembly of FIG. 1.
Figure 6:
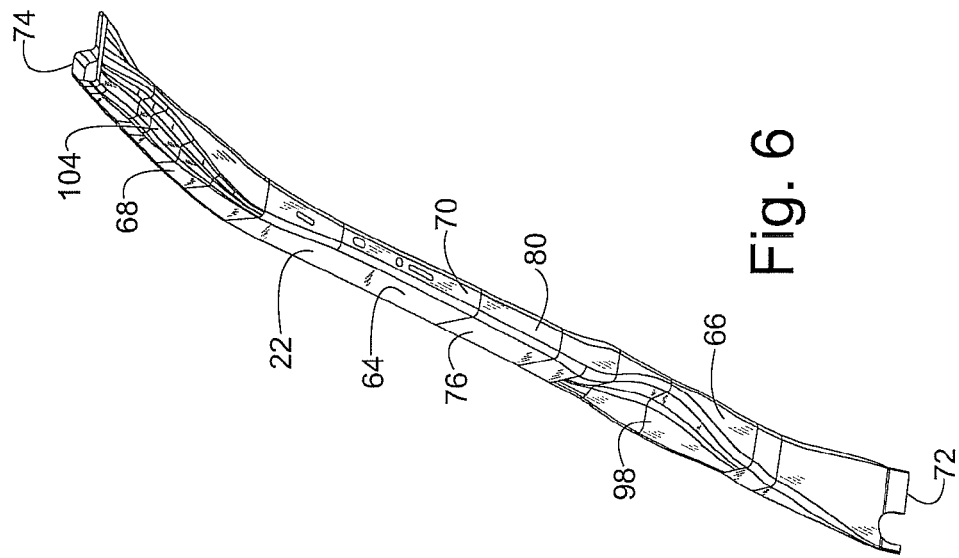
FIG. 6 is a perspective view of an exemplary embodiment of a second support pillar of the vehicle roof support pillar assembly of FIG. 1.

Once formed, the first hollow body 40 may have an elongated and generally rectangular shape, and may be generally arcuate in the vertical direction (best shown in FIG. 4). At different locations along its length (i.e., vertical direction), the first hollow body 40 may have different cross-sectional profiles, and may have a primary body that grows generally narrower in longitudinal width from a first lower portion 42 to a first upper portion 44, which may facilitate receipt between the associated doors and windows. For instance, the first lower portion 42 may have a wider longitudinal width than a first middle portion 46. And near the first upper portion 44 the primary body of the first hollow body 40 has a wider longitudinal cross-sectional width at the cross-section corresponding to FIG. 13, than that farther up the upper portion at the cross-section corresponding to FIG. 14. The first hollow body 40 may have a different shape than shown and described; for example, the first lower portion 42 may be bent and curved in the fore longitudinal direction.

In the illustrated embodiment, the first hollow body 40 may have a first lower free end 48 and a first upper free end 50. The first lower free end 48 may taper in depth to an eventual closed end as shown best in FIG. 5 for, among other reasons, connecting the first hollow body 40 to the rocker panel attachment 16. The first upper free end 50, on the other hand, may remain open to better withstand forces emitted thereat. The first hollow body 40 may have a first side surface 52 extending vertically between the first lower free end 48 and first upper free end 50. The first side surface 52 may confront the second support pillar 22 along the entire extent of the first side surface, meaning that the first side surface either directly or indirectly faces the second support pillar or makes direct contact with the second support pillar therealong. The first hollow body 40 may also have an opposite side surface 54, may have an inboard surface 56 facing toward the passenger compartment, and may have an outboard surface 58. Like the first side surface 52, these surfaces extend vertically from the first lower free end 48 to the first upper free end 50.

Referring to FIGS. 9, 10, 13, and 14, the first support pillar 20 may include a first flange 60 and a bulge 62, each located at the first upper portion 44. The first flange 60 and bulge 62 may be formed out of excess material of the tubular blank in the case of a hydroforming process, though need not. In other words, in order to make the primary body of the first upper portion 44 narrower than the first lower portion 42, the material not needed for the primary body can be used to form the first flange 60 and bulge 62. The first flange 60 may extend in the fore direction from the first hollow body 40. The first flange 60 may be formed hollow, and in some cases may be used to connect the first support pillar 20 to the roof rail 14, or to connect other body frame structures of the automobile. In other embodiments, the first flange 60 may extend vertically from the first upper portion 44 to the first middle portion 46, and/or to the first lower portion 42. The bulge 62 may extend in the cross-car direction (inboard) and may contribute to withstanding forces at the first upper portion 44.

The second support pillar 22 may be located next to the first support pillar 20 at the aft or trailing position closest to the rear door relative to the first support pillar. The first and second support pillars 20, 22 make up a two-piece side-by-side structure. The first and second support pillars 20, 22 may have similar shapes and may be coextensive in vertical length, but in the illustrated embodiment are not exact mirror-images of each other, though could be. The second support pillar 22 has a second hollow body 64 that may be formed by a similar hydroforming process as described above for the first support pillar 20.

Once formed, the second hollow body 64 may have an elongated and generally rectangular shape, and may be generally arcuate in the vertical direction. Similar to the first hollow body 40, at different locations along its length the second hollow body 64 may have different cross-sectional profiles, and may have a primary body that grows generally narrower in longitudinal width from a second lower portion 66 to a second upper portion 68, which may facilitate receipt between the associated doors and windows. For instance, the second lower portion 66 may have a wider longitudinal width than a second middle portion 70.

Figure 5:
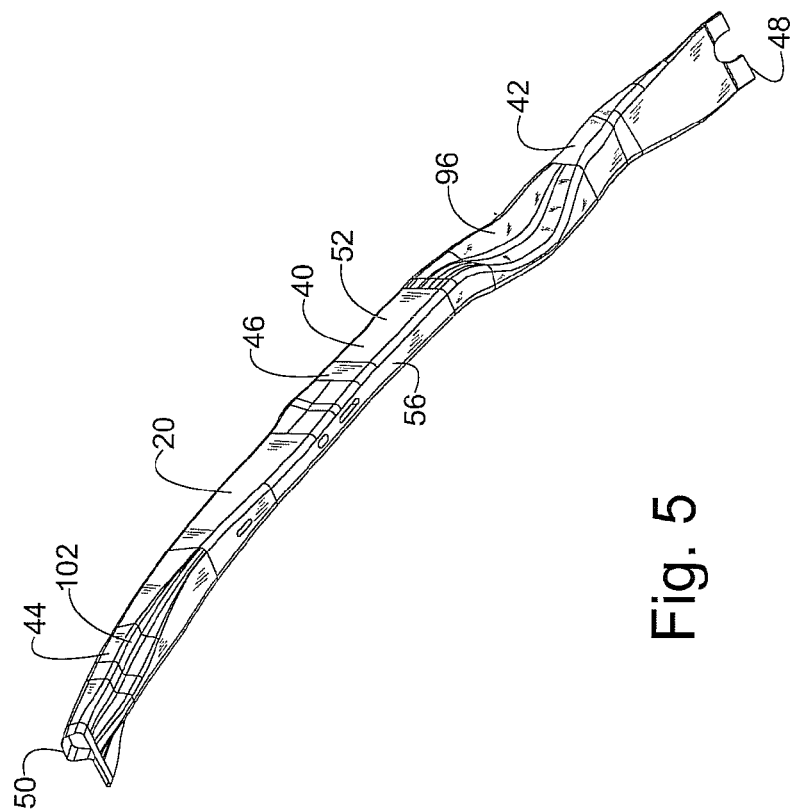
FIG. 5 is a perspective view of an exemplary embodiment of a first support pillar of the vehicle roof support pillar assembly of FIG. 1.

In the illustrated embodiment, the second hollow body 64 may have a second lower free end 72 and a second upper free end 74. The second lower free end 72 may taper in depth to an eventual closed end as best shown in FIG. 5 for, among other reasons, coupling the second hollow body 64 to the rocker panel attachment 16. The second upper free end 74, on the other hand, may remain open to better withstand forces emitted thereat. The second hollow body 64 may have a second side surface 76 extending vertically between the second lower free end 72 and the second upper free end 74. The second side surface 76 may confront the first side surface 52 along the entire extent of both side surfaces. The second hollow body 64 may also have an opposite side surface 78, an inboard surface 80, and an outboard surface 82.

Referring to FIGS. 9, 10, 13, and 14, the second support pillar 22 may include a second flange 84 and a bulge 86, each located at the second upper portion 68. The second flange 84 and bulge 86 may be formed out of excess material of the tubular blank in the case of the hydroforming process, though need not. The second flange 84 may extend in the aft direction from the second hollow body 64. The second flange 84 may be formed hollow, and in some cases may be used to connect the second support pillar 22 to the roof rail 14, or to another body frame structure of the automobile. In other embodiments, the second flange 84 may extend vertically from the second upper portion 68 to the second middle portion 70, and/or to the second lower portion 66. The bulge 86 may extend in the cross-car direction (inboard) and may contribute to withstanding forces at the second upper portion 68.

When assembled side-by-side, the first and second support pillars 20, 22 may have a generally wider longitudinal width at the first and second lower portions 42, 66 than at the first and second upper portions 44, 68. That is, the first and second support pillars 20, 22 may have main bodies that grow thinner from their lower portions to their upper portions. The first and second lower portions 42, 66 may in some cases have a wider longitudinal width because they may need to withstand greater forces such as the weight of the vehicle roof. The first and second upper portions 44, 68, on the other hand, may in some cases have a narrower width to facilitate receipt within other vehicle components.

In at least one exemplary embodiment, having a pair of (tubes) support pillars in the roof support pillar assembly 10—as opposed to single (tube) support pillar—may enable a more pronounced taper from the lower portions 42, 66 to the upper portions 44, 68 because the amount of material elongation and/or shaping needed for each of the pair of tubes may be less than that needed for a single tube to produce the same taper effect. In some cases, the pair of hydroformed support pillars may also enable use of a higher strength material than a single hydroformed support pillar. Higher strength material is often more brittle and prone to cracking compared to lower strength material. This limits the amount of material elongation and/or shaping in the hydroforming process. Because less material elongation and/or shaping is needed with the use of a pair of hydroformed support pillars, a higher strength material can be used. And because less expansion and/or shaping is needed in some cases, a thinner gauge material can be used which may reduce overall cost and weight. In one example, a roof support pillar with a single tube may require a cylindrical tubular blank made of DP600 steel with a 4.0-4.5 inch diameter and having a 2.3 mm wall thickness; when hydroformed, the single tube may elongate by 19%. In this example, a roof support pillar with a pair of tubes may have a cylindrical tubular blank made of DP780 steel with a 2.0 inch diameter and having a 2.0 mm wall thickness; when hydroformed, each of the pair of tubes may elongate by 12%. Of course other examples exist.

Also, having a pair of (tubes) support pillars in the roof support pillar assembly 10—as opposed to single (tube) support pillar—may enable a more pronounced and tighter bend along the vertical extent of each of the support pillars. In one example of tubular blanks composed of a higher strength material such as the DP789 steel or another material, a tubular blank may be suitably bent via a metal bending process to have a bend radius that is about three times (3×) the outer diameter of the tubular blank. In an example comparison where the pair of tubes each have an outer diameter of 1.5 inches and the single tube has an outer diameter of 3.0 inches, the pair of tubes may each be bent about a bend radius of 4.5 inches (3×1.5) while the single tube may only be bent about a bend radius of 9 inches (3×3). In some cases, tighter bending improves packaging, among other benefits. Of course other examples exist.

Figure 8:
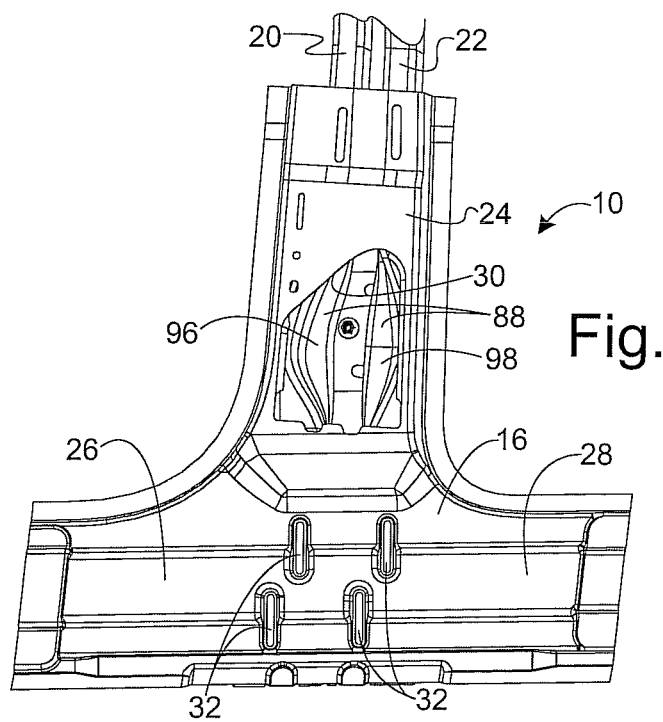
FIG. 8 is an enlarged rear view of the lower portion of FIG. 7.

Furthermore, when assembled side-by-side, the illustrated embodiment of the first and second support pillars 20, 22 may produce a first pocket 88, a noncontact region 90, a contact region 92, and a second pocket 94. The first pocket 88 may be used to receive a seat belt retractor. Referring to FIG. 8, the first pocket 88 may be located partly between the first and second support pillars 20, 22 at the first and second lower portions 42, 66. The first pocket 88 may be formed on the cross-car inboard side of the roof support pillar assembly 10 and may be formed partly by a first and second depression 96, 98. Once received in the opening 30 and in the first pocket 88, the seat belt retractor may be fixed in place via one or more welds to the rocker panel attachment 16, or via another suitable way.

The noncontact region 90 may in part provide the tapered look of the roof support pillar assembly 10 and may provide clearance for routing wiring or other items between the first and second support pillars 20, 22. Referring to FIGS. 2, 3, 9, and 12, the noncontact region 90 may be formed by the first and second side surfaces 52, 76 being spaced away from each other and not making direct contact with each other. The resulting gap forms the noncontact region 90. The noncontact region 90 may extend from the first and second lower portions 42, 66 to the first and second middle portions 46, 70. Throughout its extent, the noncontact region 90 may have varying longitudinal widths. The first and second side surfaces 52, 76 may then converge near the first and second upper portions 44, 68 and make direct contact to form the contact region 92. The contact region 92 may provide added stiffness and strength to the first and second upper portions 44, 68. Referring to FIGS. 2, 9, 13, and 14, the contact region 92 may extend through the first and second upper portions 44, 68 to the first and second upper free ends 50, 74. Throughout the contact region 92, the first and second side surfaces 52, 76 may maintain direct contact at an interface 100 which may be formed by the first and second side surfaces making complete contact as shown by cross-section in FIGS. 13 and 14. The first and second side surfaces 52, 76 may maintain complete contact throughout a majority of the vertical extent of the contact region 92, or may maintain complete contact throughout only a portion of the vertical extent of the contact region which is less than a majority.

Figures 9, 10:
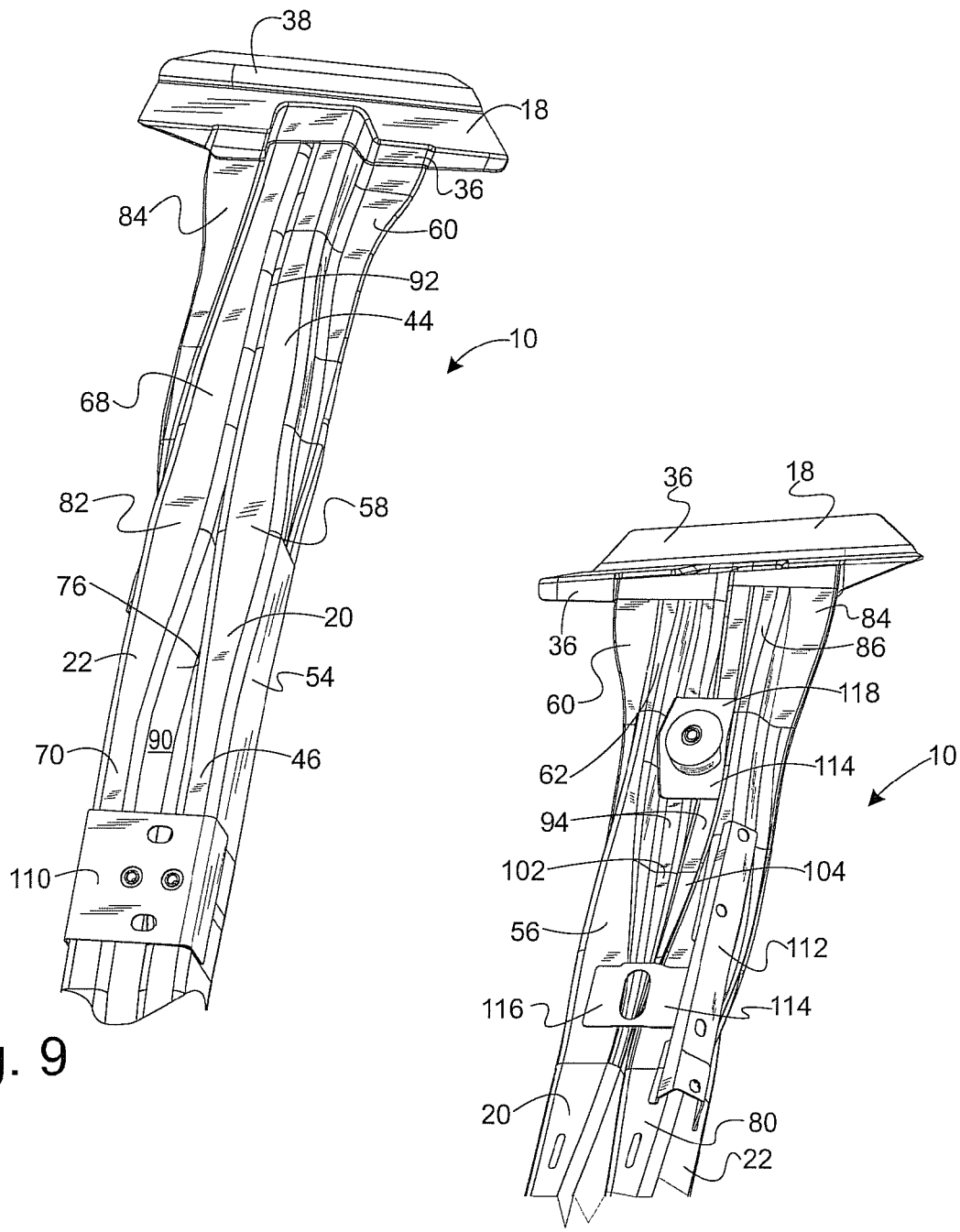
FIG. 9 is an enlarged front view of an upper portion of the vehicle roof support pillar assembly of FIG. 1.
FIG. 10 is an enlarged rear view of the upper portion of FIG. 9.

The second pocket 94 may be used to receive one or more of the component carriers, brackets, or both. Referring to FIG. 10, the second pocket 94 may be located between the first and second support pillars 20, 22 at the first and second upper portions 44, 68. The second pocket 94 may be formed on the inboard cross-car side of the roof support pillar assembly 10, and may be formed by a first and second depression 102, 104.

As previously noted, the design and construction of the roof support pillar assembly 10 may be dictated at least in part by the particular automotive body in which it will be installed. In some cases this may mean that there may be more, less, and/or different components and constructions than shown and described. For example, one or more additional pockets or contact regions may be provided, or the rocker panel attachment need not be provided, the noncontact region need not be provided whereby the contact region would extend throughout the vertical extent of the roof support pillar assembly and a channel would then provide clearance for wiring.

Figure 7:
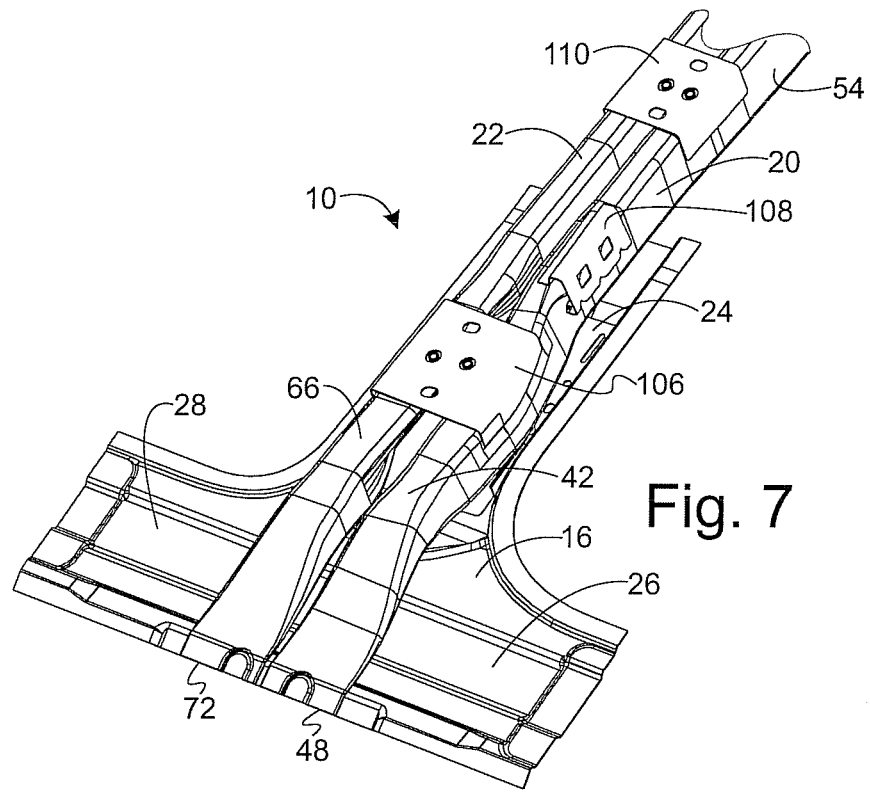
FIG. 7 is an enlarged front view of a lower portion of the vehicle roof support pillar assembly of FIG. 1.

In the illustrated embodiment, the various component carriers and brackets may include a first door bracket 106, a striker plate carrier 108, a second door bracket 110, a handle carrier 112, and a D-loop mechanism carrier 114. The first bracket 106 may hold together the first and second support pillars 20, 22, may stiffen the support pillars, and may be used to carry a lower door hinge. Referring to FIG. 7, the first bracket 106 may be located at the first and second lower portions 42, 66 near the first pocket 88 and on the cross-car outboard side of the roof support pillar assembly 10. The first bracket 106 may extend between the first and second support pillars 20, 22 and may be fixed thereto via one or more welds or by another suitable way. The striker plate carrier 108 may support a striker plate. In other embodiments, the striker plate carrier 108 may be replaced by the striker plate itself. The striker plate carrier 108 may be located on the side surface 78 and on the outboard surface 82 of the second support pillar 22, and may be fixed thereto via one or more welds, mechanical interconnection such as bolts or rivets, or by another suitable way.

Figure 11:
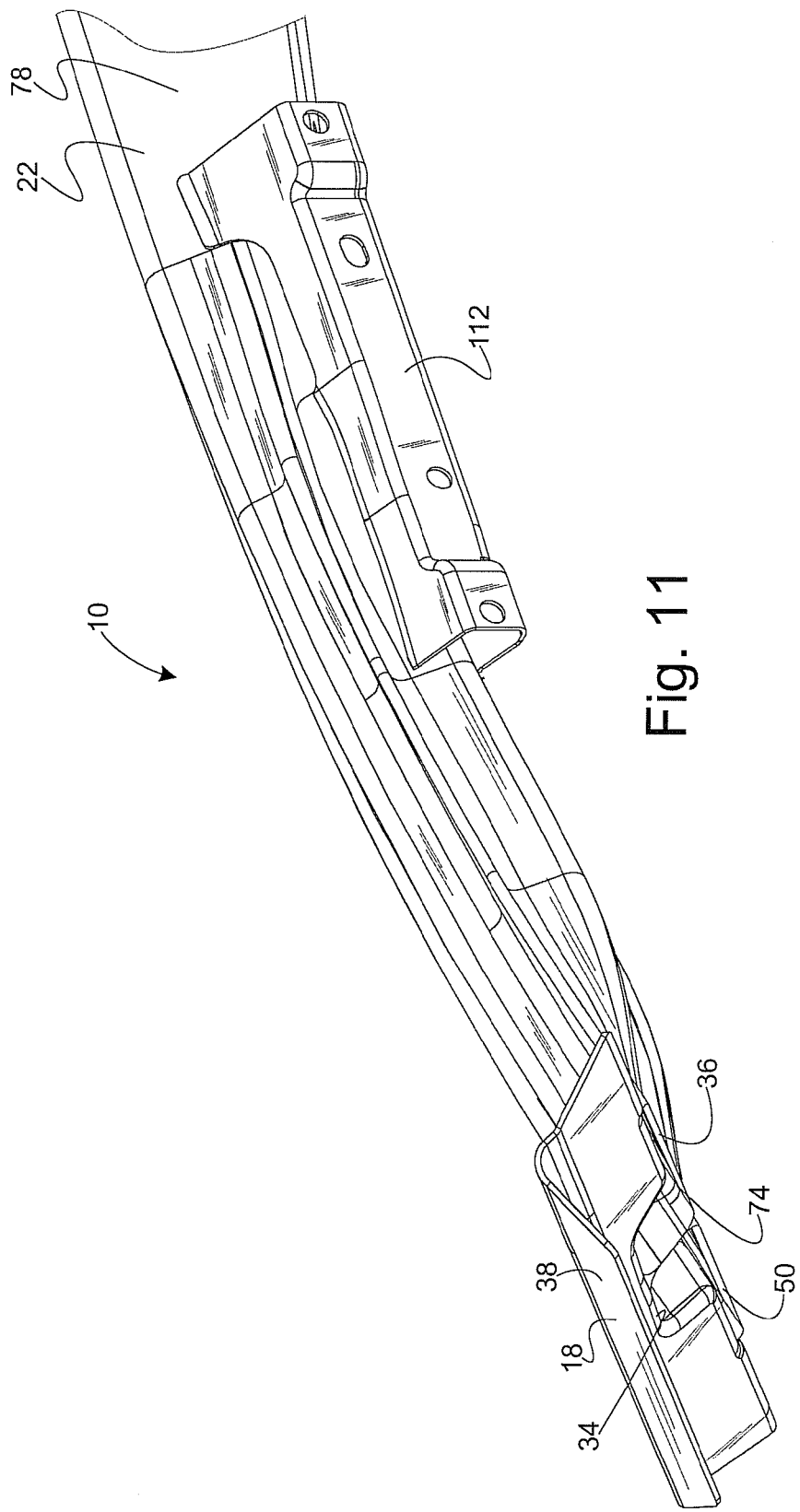
FIG. 11 is an enlarged view of the upper portion of FIG. 9.

The second bracket 110 may hold together the first and second support pillars 20, 22, may stiffen the support pillars, and may be used to carry an upper door hinge. Referring to FIG. 9, the second bracket 110 may be located at the first and second middle portions 46, 70 on the cross-car outboard side of the roof support pillar assembly 10. The second bracket 110 may extend between the first and second support pillars 20, 22 and may be fixed thereto via one or more welds or by another suitable way. The handle carrier 112 may support a handle that is accessible by a passenger. In other embodiments, the handle carrier 112 may be replaced by the handle itself. Referring to FIG. 11, the handle carrier 112 may be located at the first upper portion 44 on the side surface 78 and inboard surface 80 of the second support pillar 22, and may be fixed thereto via one or more welds, mechanical interconnection such as bolts or rivets, or by another suitable way. The D-loop mechanism carrier 114 may support a mounting piece, track, or other component of an adjustable D-loop seat belt mechanism. Referring to FIG. 10, the D-loop mechanism carrier 114 may include a first carrier 116 and a second carrier 118. Each carrier 116, 118 may extend between the first and second support pillars 20, 22 and may be fixed thereto via one or more welds or by another suitable way.

Figure 15:
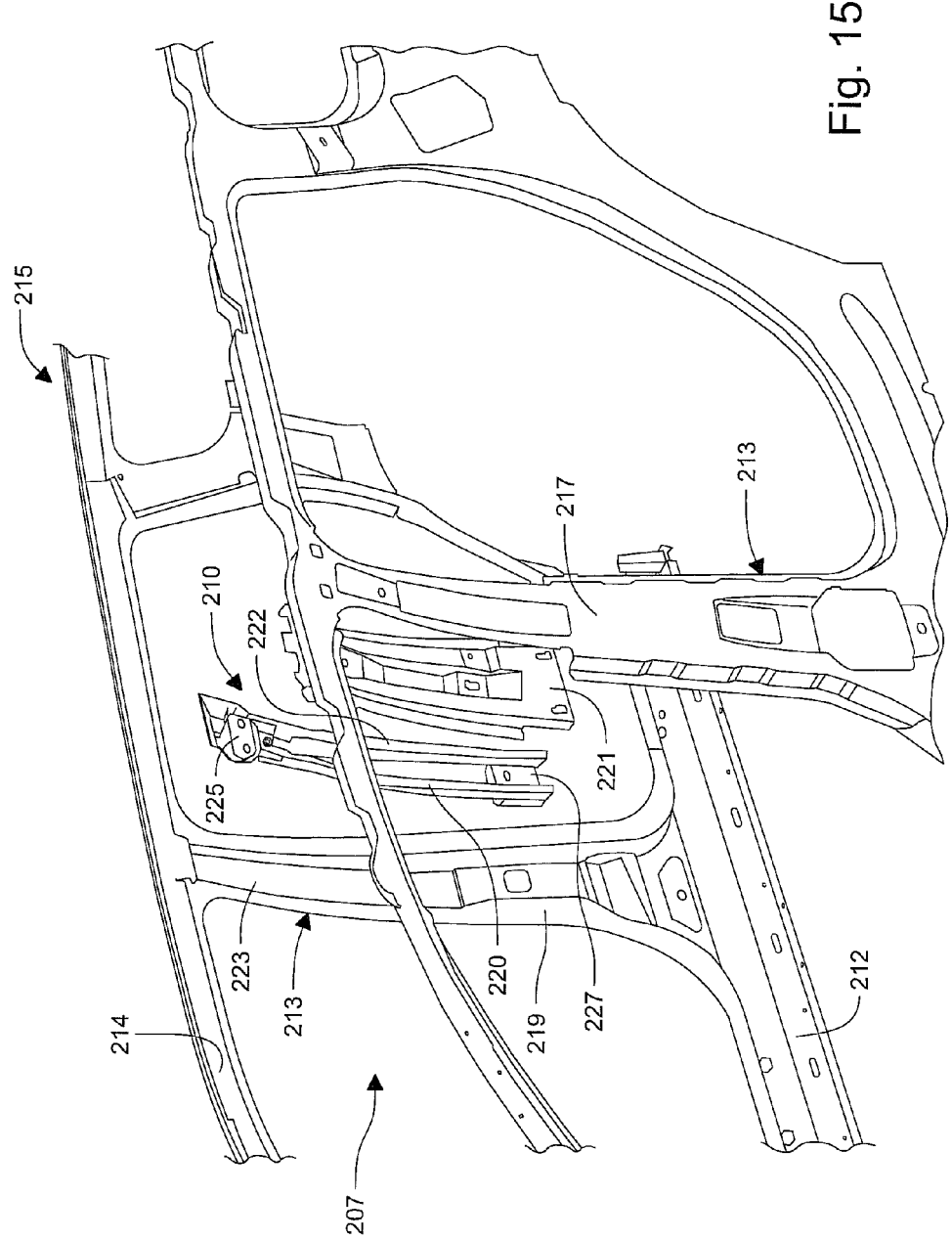
FIG. 15 is an exploded view of part of an exemplary automotive body frame including a second exemplary embodiment of a vehicle roof support pillar assembly.

A second exemplary embodiment of a vehicle roof support pillar assembly 207 is shown in FIGS. 15-23 and may include an auxiliary vehicle roof support pillar assembly (hereafter "auxiliary pillar assembly") 210 and a primary vehicle roof support pillar 213 (hereafter "primary pillar"). The auxiliary pillar assembly 210 may be formed or installed in the primary pillar 213 in order to augment the strength of and reinforce the primary pillar. Referring to FIG. 15, the primary pillar 213 is so-called "primary" because it may be an already-existing or previously constructed roof support pillar of the associated automobile, and may provide the principal support demanded of a roof support pillar in an automobile body frame 215. When installed, the primary pillar 213 may be located longitudinally between the front door and window thereof, and the rear door and window thereof, and may connect and extend in a vertical or lengthwise direction between a rocker panel 212 and a roof rail 214.

The design and construction of the primary pillar 213 may be dictated at least in part by the architecture of the particular automobile body frame in which it will be a part of. This means that it may have a different design and construction than shown and described, and may have more, less, and/or different components than shown and described; for example, the primary pillar 213 may be constructed of more pieces than shown and described that are attached together. In the illustrated embodiment, the primary pillar 213 may be made of stamped sheet metal, by an extrusion process, or by another metal working process. Referring still to FIG. 15, the primary pillar 213 may include an inner pillar panel 217 and an outer pillar panel 219 that come together in assembly to make the primary pillar, and may include a seatbelt structure 221. The inner pillar 217 may be physically closer to the passenger compartment than the outer pillar 219, and the seatbelt structure 221 may support an adjustable seatbelt assembly that is part of the automobile, but need not be provided in the primary pillar 213.

In at least one embodiment, the auxiliary pillar assembly 210 may be retrofitted in the primary pillar 213 and may add strength, support, and structural integrity to the primary pillar. The auxiliary pillar assembly 210 is so-called "auxiliary" because it may provide additional or secondary strength, support, and structural integrity to that already being provided by the primary pillar 213, and may reinforce the primary pillar. The design and construction of the auxiliary pillar assembly 210 may be dictated at least in part by the architecture of the particular primary pillar in which it will be installed. In the illustrated embodiment, the auxiliary pillar assembly 210 may be installed in and located at an upper portion 223 of the primary pillar 213; in other embodiments, for example, the auxiliary pillar assembly may be installed in and located at a middle portion or a lower portion of the primary pillar, or may be installed in and located in both the upper and middle portions. Referring to FIGS. 15-23, the auxiliary pillar assembly 210 may include a first support pillar or first auxiliary support pillar 220 (hereafter "first pillar"), a second support pillar or second auxiliary support pillar 222 (hereafter "second pillar"), a first bracket 225, and a second bracket 227.

The first pillar 220 may be located at a fore or leading position closest to the front door relative to the second pillar 222. The first pillar 220 may be a separate and distinct piece from the second pillar 222. The first pillar 220 may have a first hollow body 240 formed by a hydroforming process such as the exemplary hydroforming process described above for the first embodiment, or may be formed by another metal working process. Once formed, the first hollow body 240 may better resist breaking, extreme buckling, bending, and deformation along its vertical length thereof as compared to a non-hollow body. The first hollow body 240 may have an elongated shape and may have different cross-sectional profiles at different locations along its vertical length. The first hollow body 240 may generally grow wider in longitudinal lateral width from a first lower portion 242 to a first upper portion 244. At the first lower portion 242, the first hollow body 240 may have a rectangular cross-sectional profile (FIG. 23), and at the first upper portion 244, the first hollow body may transition to and may have an S-shaped cross-sectional profile (FIG. 22).

In the illustrated embodiment, the first hollow body 240 may have a first lower free end 248 and a first upper free end 250. The first lower and upper free ends 248, 250 may form open ends to withstand forces emitted thereto, though one or both could taper in cross-car depth to an eventual closed end. The first hollow body 240 may also have a first side surface 252 extending vertically from the first lower free end 248 to the first upper free end. The first side surface 252 may confront the second pillar 222 along the entire extent of the first side surface, meaning that the first side surface directly and/or indirectly faces the second pillar and/or makes direct contact with the second pillar therealong. The first hollow body 240 may further have an opposite side surface 254, an inboard surface 256 facing toward the passenger compartment of the automobile, and an outboard surface 258. Like the first side surface 252, the surfaces 254, 256, 258 may extend vertically from the first lower free end 248 to the first upper free end.

Referring to FIGS. 19-23, the illustrated embodiment of the first hollow body 240 may include a first channel 259 bounded within the body and extending vertically from the first lower free end 248 to the first upper free end 250, and may include a first flange 260 located at the first upper portion 244. The first flange 260 may be formed into the first hollow body 240 in order to, in this example, conform the first hollow body to the primary pillar 213. The first hollow body 240 may also include a mounting hole 261 for attachment to another component, and may include a formation 263.

Referring again to FIGS. 15-23, the second pillar 222 may be located next to the first pillar 220 at an aft or trailing position closest to the rear door relative to the first pillar. The first and second pillars 220, 222 make up a two-piece side-by-side structure, may be coextensive in vertical length with respect to each other, and may be virtually mirror-images with respect to each other. The second pillar 222 may have a second hollow body 264 formed by a similar hydroforming process as described above for the first hollow body 240 or by another metal working process, and may have a similar structure as the first hollow body.

Once formed, the second hollow body 264 may better resist breaking, extreme buckling, bending, and deformation along its vertical length thereof as compared to a non-hollow body. The second hollow body 264 may have an elongated shape and may have different cross-sectional profiles at different vertical locations along its length. The second hollow body 264 may generally grow wider in longitudinal width from a second lower portion 266 to a second upper portion 268. At the second lower portion 266, the second hollow body 264 may have a rectangular cross-sectional profile (FIG. 23), and at the second upper portion 268, the second hollow body may transition to and may have an S-shaped cross-sectional profile (FIG. 22).

In the illustrated embodiment, the second hollow body 264 may have a second lower free end 272 and a second upper free end 274. The second lower and upper free ends 272, 274 may form open ends to withstand forces emitted thereto, though one or both could taper in cross-car depth to an eventual closed end. The second hollow body 264 may also have a second side surface 276 extending vertically from the second lower free end 272 to the second upper free end 274. The second side surface 276 may confront the first side surface 252 along the entire extent of both side surfaces. The second hollow body 264 may further have an opposite side surface 278, an inboard surface 280 facing toward the passenger compartment of the automobile, and an outboard surface 282. Like the second side surface 276, the surfaces 278, 280, 282 may extend vertically from the second lower free end 272 to the second upper free end 274.

Referring to FIGS. 19-23, the illustrated embodiment of the second hollow body 264 may include a second channel 283 bounded within the body and extending vertically from the second lower free end 272 to the second upper free end 274, and may include a second flange 284 located at the second upper portion 268. The second flange 284 may be formed into the second hollow body 264 in order to, in this example, conform the second hollow body to the primary pillar 213.

In at least one exemplary embodiment, having a pair of auxiliary support pillars (tubes) to make up the auxiliary pillar assembly 210, as opposed to a single auxiliary support pillar (tube), may enable a more pronounced and dramatic overall change-in-shape of the auxiliary pillar assembly because the amount of material elongation and/or shaping needed in a hydroforming process for each of the pair of tubes may be less than that needed for a single tube to produce the same overall change-in-shape. In some cases, the pair of hydroformed auxiliary support pillars may also enable use of a higher strength material as compared to a single hydroformed auxiliary support pillar. Higher strength material is often more brittle and prone to cracking compared to lower strength material, and in some cases this may limit the amount of material elongation and/or shaping in the hydroforming process. Because less material elongation and/or shaping may be needed with the use of a pair of hydroformed auxiliary support pillars, a higher strength material can be used. And because less elongation and/or shaping may be needed, a thinner gauge material can be used which may reduce overall cost and weight. Also, having a pair of auxiliary support pillar (tubes) to make up the auxiliary pillar assembly 210—as opposed to a single auxiliary support pillar (tube)—may enable a more pronounced and tighter bend along the vertical extent of each of the auxiliary support pillars. The example comparison described above for the first exemplary embodiment (i.e., 3×bending radius) may be applicable in some cases in this embodiment.

Referring to FIGS. 15, 18, and 19-23, when assembled side-by-side the illustrated embodiment of the first and second pillars 220, 222 may produce a noncontact region 290, a contact region 292, and a pocket 294. The noncontact region 290 may be formed by the first and second side surfaces 252, 276 being spaced away from each other and not making direct contact with each other—the resulting gap therebetween may form the noncontact region. Throughout its extent, the noncontact region 290 may have varying longitudinal widths; and in different embodiments the noncontact region may have different vertical lengths. In the illustrated embodiment, the first and second side surfaces 252, 276 may then converge at the upper portions of the first and second pillars, and may make direct contact to form the contact region 292. The contact region 292 may provide added stiffness and strength to the auxiliary pillar assembly 210. Throughout the contact region 292, the first and second side surfaces 252, 276 may maintain direct contact with each other. And in different embodiments, the contact region 292 may have different vertical lengths. The pocket 294 may be used to receive one or more component carriers, brackets, or both. The pocket 294 may be located between the first and second pillars 220, 222 at the first and second upper portions 244, 268. The pocket 294 may be formed on the cross-car inboard side of the auxiliary pillar assembly 210, and may be formed by a pair of depressions in the pillars. Furthermore, when assembled side-by-side the auxiliary pillar assembly 210 may be generally longitudinally wider at the lower portions 242, 266 than at the upper portions 244, 268; this may be to accommodate the primary pillar 213, and need not be the case in other embodiments.

Figure 17:
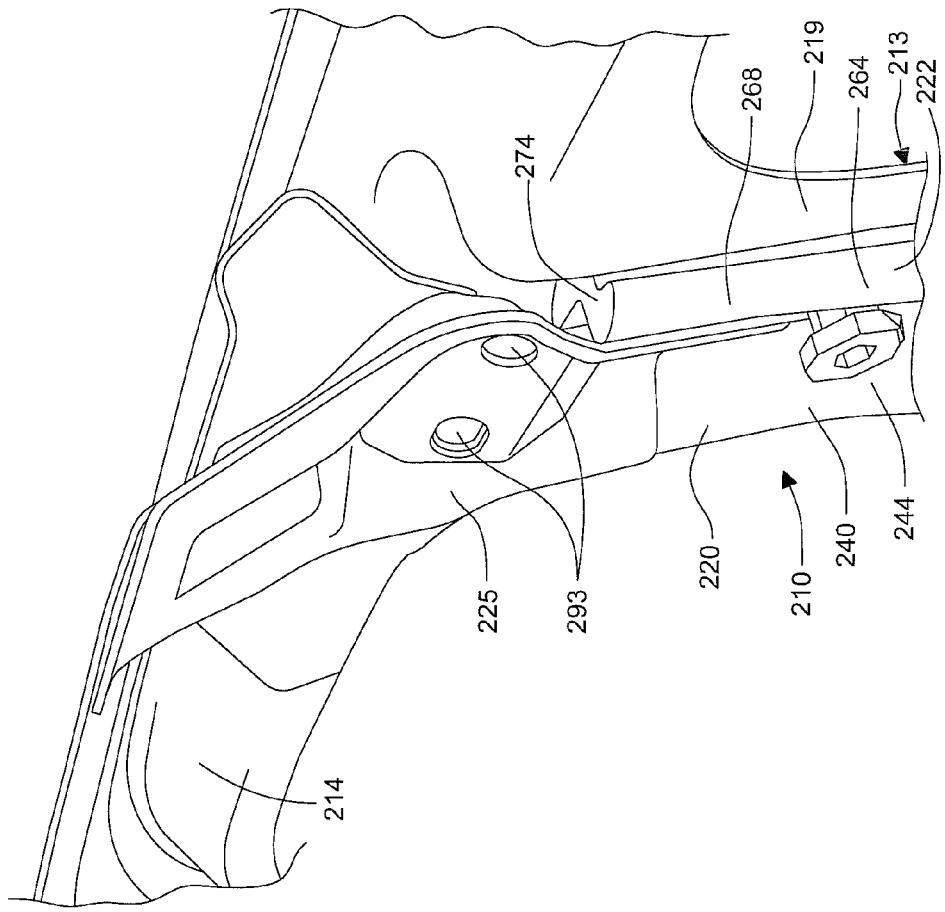
FIG. 17 is a perspective view of an exemplary embodiment of a first bracket that can be used with the vehicle roof support pillar assembly of FIG. 15.
Figure 16:
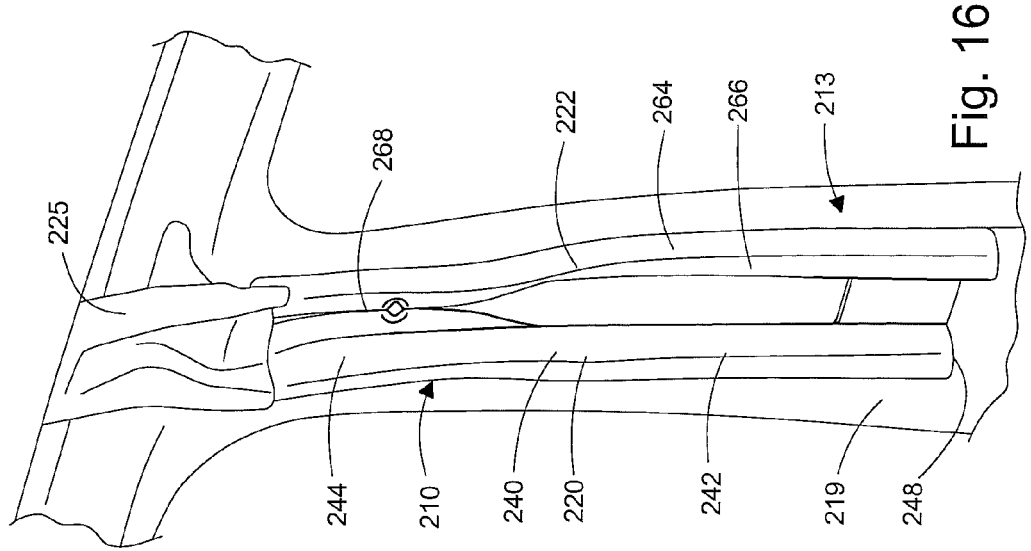
FIG. 16 is a perspective view of the vehicle roof support pillar assembly of FIG. 15.

Referring to FIGS. 16 and 17, the first or upper bracket 225 may hold together the first and second hollow bodies 240, 264 and/or may attach the first and second hollow bodies to the primary pillar 213. The first bracket 225 may be separately attached to the hollow bodies 240, 264 and to the primary pillar 213 via one or more welds, mechanical interconnections such as bolts or rivets, or by another suitable way. For example, the first bracket 225 may be welded to the roof rail 214 at weld spots 293, and need not be attached to the first and second hollow bodies 240, 264 whereby the hollow bodies would simply bear against the first bracket. The first bracket 225 may transmit forces between the first and second hollow bodies 240, 264 and the primary pillar 213. In the illustrated embodiment, the first bracket 225 may be made of metal and may be stamped or otherwise metalworked to complement the shape of the first and second hollow bodies 240, 264 at the respective upper portions 244, 268 and/or the shape of the roof rail 214.

Figure 18:
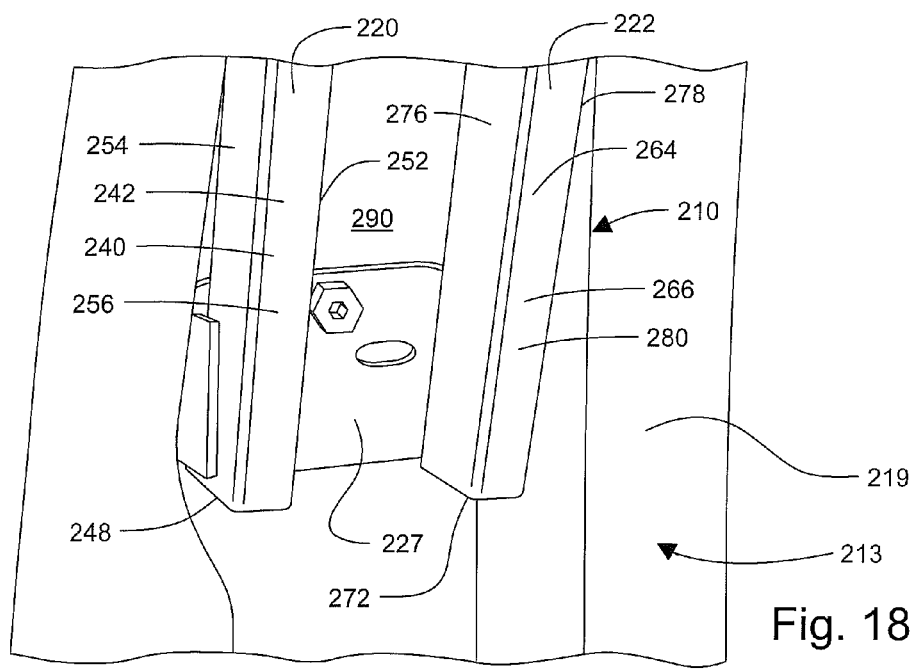
FIG. 18 is a perspective view of an exemplary embodiment of a second bracket that can be used with the vehicle roof support pillar assembly of FIG. 15.
Figure 19:
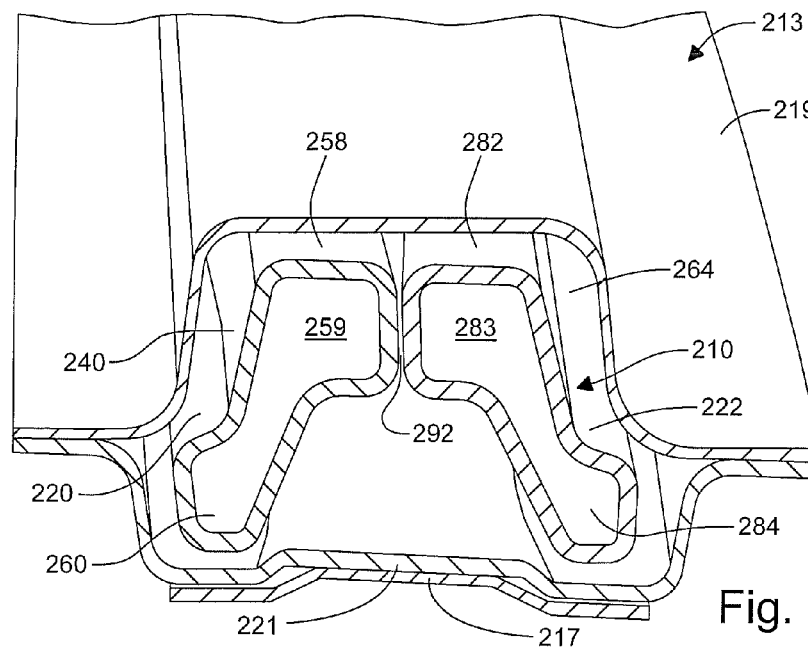
FIG. 19 is a cross-sectional view of the vehicle roof support pillar assembly of FIG. 15 in an assembled state and installed in the automotive body frame of FIG. 15, the cross-sectional view being taken at an upper portion of the vehicle roof support pillar assembly.

Referring to FIG. 18, the second or lower bracket 227 may hold together the first and second hollow bodies 240, 264 and/or may attach the first and second hollow bodies to the primary pillar 213. The second bracket 227 may be separately attached to the hollow bodies 240, 264 and to the primary pillar 213 via one or more welds, mechanical interconnections such as bolts or rivets, or by another suitable way. For example, the second bracket 227 may be welded to each of the first and second hollow bodies 240, 264, and may be attached to the outer pillar 219 via bolts or other fasteners. The second bracket 227 may transmit forces between the first and second hollow bodies 240, 264 and the primary pillar 213. In the illustrated embodiment, the second bracket 227 may be made of metal and may be stamped or otherwise metalworked to complement the shape of the first and second hollow bodies 240, 264 at the respective lower portions 242, 266 and/or the shape of the primary pillar 213 thereat. In one embodiment, the second bracket 227 can be an already existing component of the primary pillar 213, such as a door hinge bracket that is unmodified from its usual construction or that is modified to accommodate attachment of the auxiliary pillar assembly 210.

In another embodiment, the first and second brackets 225, 227 need not be provided. Instead, the first and second hollow bodies 240, 264 may be attached directly to each other and/or directly to the primary pillar 213 via one or more welds, mechanical interconnections such as bolts or rivets, or by another suitable way. An exemplary weld is a spot or mig weld, though other welds are possible.

As previously noted, the design and construction of the auxiliary pillar assembly 210 may be dictated at least in part by the architecture of the particular primary pillar in which it will be installed. In some cases this may mean that there are more, less, and/or different designs, constructions, and components than shown and described. For example, one or more additional brackets may be provided, the noncontact region need not be provided in which case the contact region would extend throughout the entire vertical extent of the first and second pillars, and/or the first and second hollow bodies may be shaped differently including different lengths and cross-sectional profiles.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A vehicle roof support pillar assembly, comprising:
a first support pillar having a first hollow body defined by a tubular piece of material and having a first side surface; and
a second support pillar having a second hollow body defined by a tubular piece of material that is separate from the tubular piece of material that defines the first support pillar and having a second side surface and being positioned next to the first hollow body, the first and second side surfaces of the first and second hollow bodies contacting each other along at least a portion of their vertical extent.

2. The vehicle roof support pillar assembly of claim 1 further comprising at least one bracket to couple the first and second hollow bodies together.

3. The vehicle roof support pillar assembly of claim 1 wherein the first and second side surfaces converge toward each other at a respective first and second upper portion of the first and second hollow bodies such that the first and second side surfaces are spaced away from each other and do not contact each other at a respective first and second lower portion of the first and second hollow bodies, and such that the first and second side surfaces contact each other at the respective first and second upper portions.

4. The vehicle roof support pillar assembly of claim 1 wherein the first support pillar includes a first flange extending in a fore longitudinal direction from the first hollow body and located at a first upper portion of the first hollow body, and wherein the second support pillar includes a second flange extending in an aft longitudinal direction from the second hollow body and located at a second upper portion of the second hollow body.

5. The vehicle roof support pillar assembly of claim 1 further comprising a rocker panel attachment coupled to a first and second lower portion of the first and second support pillars, and comprising a roof rail attachment coupled to a first and second upper portion of the first and second support pillars.

6. The vehicle roof support pillar assembly of claim 1 further comprising a pocket located partly between the first and second support pillars at a respective first and second lower portion of the first and second hollow bodies, the pocket sized to receive a seat belt retractor.

7. The vehicle roof support pillar assembly of claim 1 further comprising a noncontact region located at a first and second lower portion of the first and second hollow bodies and formed in part by the first and second side surfaces being spaced away from each other.

8. The vehicle roof support pillar assembly of claim 1 wherein the first support pillar has a first lower free end that tapers closed and that is wider in a longitudinal direction than a first middle portion of the first support pillar, and wherein the second support pillar has a second lower free end that tapers closed and that is wider in a longitudinal direction than a second middle portion of the second support pillar.

9. The vehicle roof support pillar assembly of claim 1 wherein the first support pillar has a first upper free end that is open, and wherein the second support pillar has a second upper free end that is open.

10. The vehicle roof support pillar assembly of claim 1 wherein the first hollow body is formed by a hydroforming process and the second hollow body is formed by a hydroforming process.

11. An auxiliary vehicle roof support pillar assembly, comprising:
a first auxiliary support pillar having a first hollow body formed from a tubular blank of material and constructed to extend vertically along at least a portion of a primary vehicle roof support pillar and constructed to attach to the primary vehicle roof support pillar; and
a second auxiliary support pillar having a second hollow body formed from a tubular blank of material and constructed to extend vertically along the at least a portion of the primary vehicle roof support pillar next to the first hollow body, and constructed to attach to the primary vehicle roof support pillar so that the first and second auxiliary support pillars reinforce the primary vehicle roof support pillar, and wherein the second auxiliary support pillar is separate from and not directly connected to the first auxiliary support pillar along at least a portion of the length of the second auxiliary support pillar to define a noncontact region having a gap that extends between the first auxiliary support pillar and the second auxiliary support pillar.

12. The auxiliary vehicle roof support pillar assembly of claim 11 wherein the first and second hollow bodies are formed by a hydroforming process.

13. The auxiliary vehicle roof support pillar assembly of claim 11 wherein the first and second hollow bodies are coextensive in vertical length along the at least a portion of the primary vehicle roof support pillar.

14. The auxiliary vehicle roof support pillar assembly of claim 11 wherein the first hollow body has a first side surface and the second hollow body has a second side surface substantially confronting the first side surface, the first and second side surfaces contacting each other along at least a portion of their respective vertical extents to form a contact region therebetween.

15. The auxiliary vehicle roof support pillar assembly of claim 11 wherein the first hollow body has a first side surface and the second hollow body has a second side surface substantially confronting the first side surface, the first and second side surfaces being spaced away from each other and not contacting each other and not directly connected to each other along at least a portion of their respective vertical extents to form a noncontact region therebetween.

16. The auxiliary vehicle roof support pillar assembly of claim 11 further comprising a first bracket, wherein the first and second hollow bodies are attached to the primary vehicle roof support pillar by way of the first bracket.

17. The auxiliary vehicle roof support pillar assembly of claim 16 further comprising a second bracket, wherein the first and second hollow bodies are attached to the primary vehicle roof support pillar by way of the second bracket.

18. The auxiliary vehicle roof support pillar assembly of claim 11 wherein the first and second hollow bodies are attached directly to the primary vehicle roof support pillar by way of at least one weld.

19. The auxiliary vehicle roof support pillar assembly of claim 11 wherein, when assembled, the auxiliary vehicle roof support pillar assembly is located at an upper portion of the primary vehicle roof support pillar.

20. A vehicle roof support pillar assembly, comprising:
a primary vehicle roof support pillar adapted to extend between a vehicle roof rail and a vehicle rocker panel; and an auxiliary vehicle roof support pillar assembly including a first auxiliary support pillar and a second auxiliary support pillar, the first auxiliary support pillar having a first hollow body extending vertically along at least a portion of the primary vehicle roof support pillar, the second auxiliary support pillar having a second hollow body that is separate from the first auxiliary support pillar and extends vertically along the at least a portion of the primary vehicle roof support pillar next to the first hollow body, the first and second auxiliary support pillars reinforcing the primary vehicle roof support pillar.

\* \* \* \* \*